United States Patent [19]

Avakian

[11] Patent Number: 4,727,600
[45] Date of Patent: Feb. 23, 1988

[54] INFRARED DATA COMMUNICATION SYSTEM

[76] Inventor: Emik Avakian, 67 Applewood Dr., Chicopee, Mass. 01022

[21] Appl. No.: 866,786

[22] Filed: May 23, 1986

Related U.S. Application Data

[63] Continuation-in-part of Ser. No. 702,348, Feb. 15, 1985, abandoned.

[51] Int. Cl.$^4$ .............................................. H04B 9/00
[52] U.S. Cl. ....................................... 455/601; 455/607
[58] Field of Search ............... 455/601, 606, 607, 617; 179/2 EA; 379/56

[56] References Cited

U.S. PATENT DOCUMENTS

| | | | |
|---|---|---|---|
| 4,074,127 | 2/1978 | Mochida et al. | 455/601 |
| 4,516,221 | 5/1985 | Nakata et al. | 455/607 |
| 4,542,262 | 9/1985 | Ruff | 179/2 EA |

FOREIGN PATENT DOCUMENTS

| | | | |
|---|---|---|---|
| 2823931 | 12/1979 | Fed. Rep. of Germany | 455/600 |
| 3244712 | 6/1984 | Fed. Rep. of Germany | 455/601 |
| 3248544 | 7/1984 | Fed. Rep. of Germany | 455/607 |
| 58-125923 | 7/1983 | Japan | 455/601 |
| 60-7232 | 1/1985 | Japan | 455/607 |

OTHER PUBLICATIONS

Alessi et al.—"A Negative Ion Sputter"—Nuclear Instruments and Methods—147—No. 2—01 Dec. 1977, pp. 305–312.
Gosch—"Computer Cuts the Distance"—Electronics—vol. 54, No. 7, Apr. 21, 1981, pp. 83, 84.

*Primary Examiner*—Joseph A. Orsino, Jr.
*Attorney, Agent, or Firm*—Chilton, Alix & Van Kirk

[57] ABSTRACT

An infrared data repeater adapted for providing communication of infrared signals across an infrared transmission barrier comprises a pair of relay units mounted at opposite ends of a housing. The housing may be mounted in the wall of a building. Arrays of receiver and transmitter elements of the relay units are configured to provide communication over substantial solid angles. The relay units may be selectively directionally orientated. The elements define different effective pre-established solid angles of reception and transmission. The elements are arranged so that there is an inverse relationship between the solid angle and the distance between the element and a corresponding infrared receiver or transmitter.

20 Claims, 17 Drawing Figures

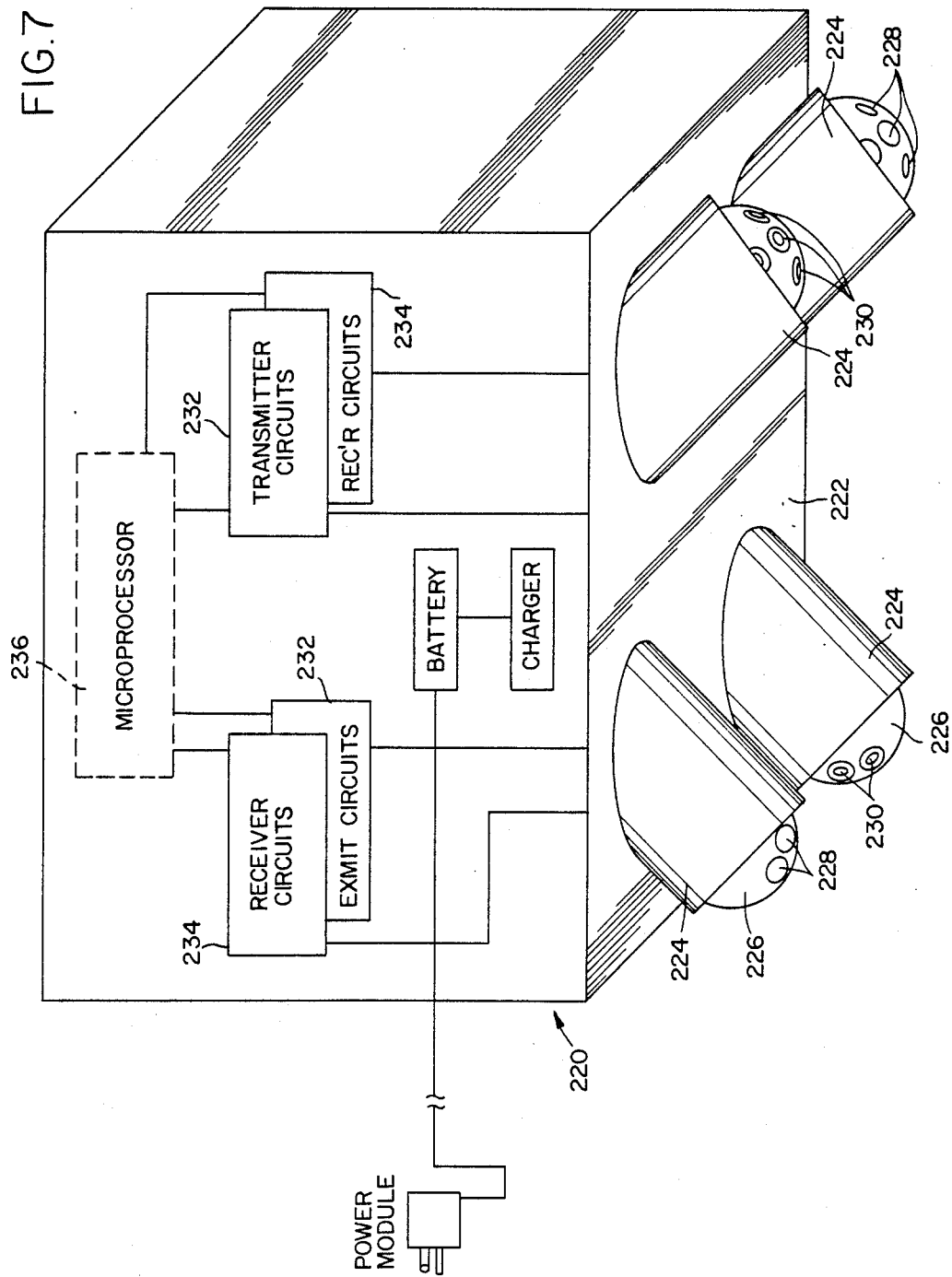

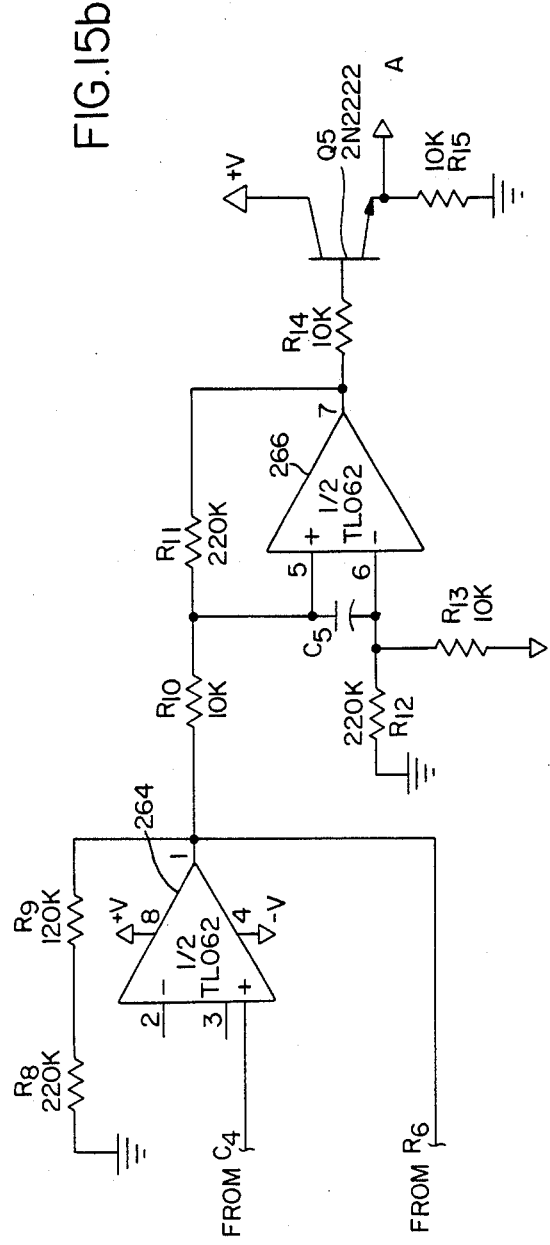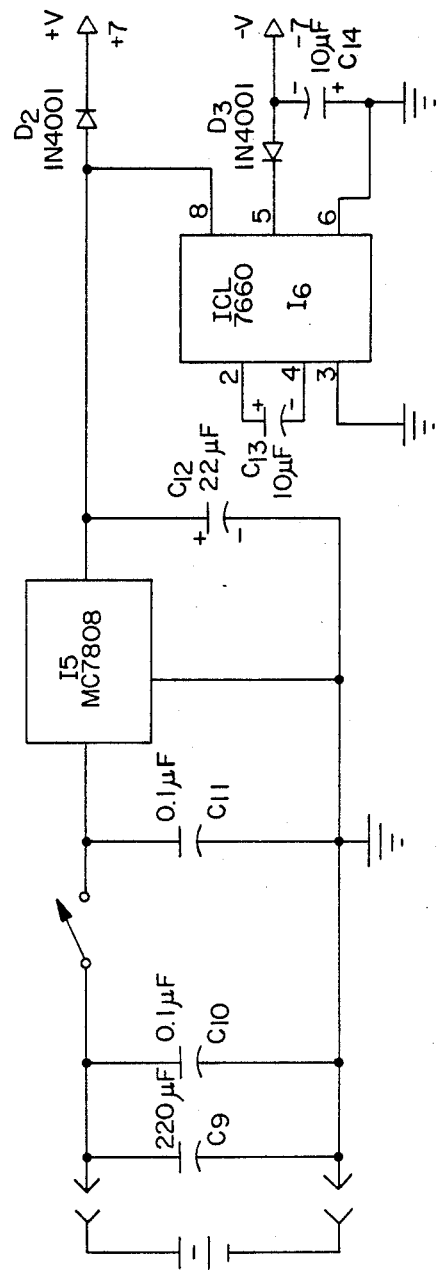
FIG.15b

INFRARED DATA COMMUNICATION SYSTEM

CROSS-REFERENCE TO RELATED APPLICATION

This application is a continuation-in-part of U.S. patent application Ser. No. 702,348 filed Feb. 15, 1985 now abandoned.

BACKGROUND OF THE INVENTION (1) Field of the Invention

This invention relates to communication systems which employ electromagnetic signals in the infrared range. More particularly, this invention relates to communication systems which employ infrared transmission for bi-directional communication between stations which are not functionally disposed for direct infrared communication.

A number of recent technological advancements have employed infrared transmission to provide remote communication between a control station and an appliance or working device such as, for example, the familiar remote control employed, for tuning channels of a television set. Cordless telephones have employed infrared transmission to provide communication between a stationary transmitter/receiver and a portable telephone hand set which may be relatively freely moved about a given space within the transmission limit of the infrared transmission. The "IBM" PC Jr. computer employs infrared transmission to provide communication between the computer and the computer keyboard.

A principal factor in the increasing popularity of infrared transmission is the immunity of infrared transmission to common forms of interference which disrupt radio wave and ultrasonic transmissions. Moreover, immunity to unauthorized interception of infrared transmission is enhanced under conditions wherein a protected line of sight beam path is provided for the transmission. However, a fundamental drawback to the widespread use of infrared transmission is the requirement that the transmitter and receiver of the infrared transmission be functionally positioned within a common line of sight. Accordingly, the general objects of the present invention are to provide novel and improved systems for the transmission of infrared electromagnetic signal communication between stations wherein a direct common line of sight does not exist.

(2) Description of the Prior Art

Exemplary prior art transmission systems which employ infrared signal transmissions are typically limited to common line of sight transmitter and receiver configurations. U.S. Pat. No. 3,705,986 entitled "OPTICAL DATA TRANSMISSION SYSTEM" discloses a point-to-point digital transmission system which employs pulse modulated infrared beams. The system employs a pair of optical transceiver units which link one computer installation to another via a line of sight communication. The system employs an infrared emitting device and a photo detector at each of a pair of infrared transceivers in side-by-side relationship to provide parallel transmission paths between a pair of transceivers for providing high speed transmission data.

U.S. Pat. No. 3,927,316 entitled "WIRELESS SPEAKER SYSTEMS USING INFRARED LINK" discloses a unidirectional transmission system for transmitting audio signals from a fixed transmitter to a movable receiver. An infrared wireless speaker system employs an infrared wide band frequency modulated transmitter and receiver in combination with a conventional audio receiver and speaker system. A pulse rate modulated infrared light source is employed for transmitting an audio signal to remotely positioned speaker systems.

In U.S. Pat. No. 4,063,083 entitled "DATA COMMUNICATION SYSTEM USING LIGHT COUPLED INTERFACES" a data communication system is provided between spaced locations by interface assemblies positioned within a light path. Each interface assembly includes light sensitive and/or light emitting elements for extracting and/or supplementing light portions to a column of light passing along the path.

Cannon, Inc. of Tokyo, Japan has marketed an optical coupler Model X-721 which employs an infrared transmitter receiver within a desk mounted structure for facilitating infrared communication within a computer system. The infrared beam receiving and transmitting housing is mounted on a vertically orientated tubular structure having a rectangular pedestal. A modem connected to a telephone circuit may communicate with a computer via the coupler by means of infrared transmission. Infrared electromagnetic signal transmission represents on efficient mode for data communication.

U.S. Pat. No. 3,618,021 entitled "DATA COMMUNICATION SYSTEM AND TECHNIQUE TAGGING DATA DIFFERENT CLASSES", co-invented by the inventor herein, discloses a data communication technique adaptable for infrared signal transmission for transmitting information of two or more classes over a single channel or line. A packet switching technique is employed so that selected messages may be transmitted between a central computer site and various remote stations. Means are provided for selectively transmitting messages to a plurality of remote stations.

SUMMARY OF THE INVENTION

The present invention is an improvement over the above-discussed prior art infrared communication systems by providing an efficient means for transmitting and receiving electromagnetic signals in the infrared range under conditions wherein a communication barrier such as a building wall prevents the direct transmission of infrared signals between communication stations. A repeater station is disposed at the communication barrier to transmit and receive infrared electromagnetic signals from and to first and second communication stations disposed on opposite sides of the barrier. A first relay is positioned on one side of the barrier to transmit and receive infrared electromagnetic signals to and from the first station. A second relay positioned on the other side of the barrier transmits and receives infrared electromagnetic signals to and from the second station. Electrical communication is provided between the first and second relays. In a preferred form, at least one of the relays comprises a plurality of receiver elements and a plurality of irradiator elements configured in an array for receiving and transmitting infrared electromagnetic signals over a substantial solid angle. In a basic embodiment of the invention, one of the relays essentially consists of a single photodetector with associated electronics for shaping a signal received by the detector to form a binary bit. The other corresponding relay essentially consists of a single photoemitter with associated electronics to buffer a binary bit and form a corresponding signal for application to the emitter.

The array of elements defines a surface which is substantially a section of a sphere. An elongated tubular housing encloses the electrical connection between the repeater relays. Shell-like housings connect at opposite ends of the tubular housing to exteriorly enclose the repeater relays. The tubular housing may be sectioned in telescoping fashion to form a housing having a variable longitudinal dimension. Semi-flexible necks connect the tubular housing and shell-like housings for selectively directionally orientating the array of receiver and irradiator elements. The tubular member is adapted for positioning in a wall with the shell-like housings of the relays being disposed at opposite sides of the wall. One of the communication stations may suitably assume the form of a self-contained hand held device having a keyboard for activating a photoemitter and a display means activatable in response to infrared energy impinging on a photodetector.

The receiver elements each have a receiving window which encompasses a pre-established solid angle with at least two of the solid angles being unequal. The receiving elements are arranged so that the windows overlap and combine to encompass a substantial solid angle. The transmitter elements each generate an infrared beam which traverses a pre-established solid angle with at least two of the beam solid angles being unequal. The transmitter elements are arranged so that the beam angles overlap and combine to encompass a substantial solid angle. A ball and socket type structure is employed for mounting and orienting the receiver and transmitter elements. The circuitry for the receiving elements includes photodetector(s) which are employed as the receiving elements.

BRIEF DESCRIPTION OF THE DRAWING

The present invention may be better understood and its numerous objects and advantages will become apparent to those skilled in the art by reference to the accompanying drawing wherein:

FIG. 7 is a schematic diagram of a third embodiment of an infrared data repeater in accordance with the present invention;

FIGS. 15a and 15b are schematic circuit diagrams for the infrared data receiver of FIG. 6.

DESCRIPTION OF THE PREFERRED EMBODIMENTS

Figure 1:
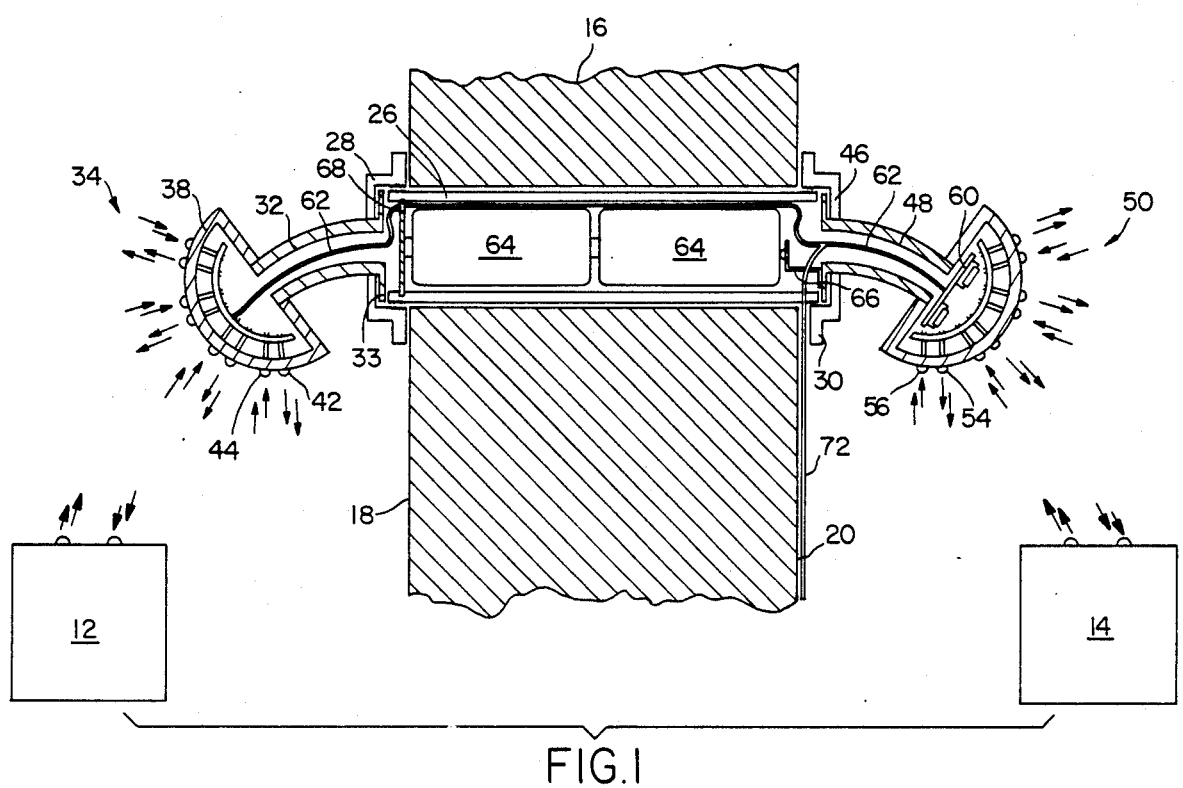
FIG. 1 is a side sectional view, partly in schematic, of an infrared data repeater in accordance with the present invention.

With reference to the drawing wherein like numerals represent like parts throughout the several FIGURES, a communication system designated generally by the numeral 10 employs infrared electromagnetic signals for communicating between a pair of communication stations 12 and 14. Stations 12 and 14 may assume a variety of forms as will be further described below. The stations are separated by a barrier illustrated as a building wall 16 which does not permit the direct transmission of infrared electromagnetic signals between station 12 and 14. Stations 12 and 14 may be suitably described as two compatible communication stations which do not have a common line of sight and which operate by transmitting and/or receiving electromagnetic signals in the infrared range.

An exemplary application of the present invention is in the context of a building security system wherein the barrier to the direct passage of infrared transmissions is a structural wall 16 of the building. Wall 16 may constitute an interior or exterior wall of the structure and in the illustrated embodiment may be viewed as a wall wherein side 18 is exterior to a secured area and side 20 is interior of the secured area. Station 12 may be viewed as a station which communicates via infrared signal transmission with station 14 interiorly of the secured area for selectively permitting and/or preventing access to the secured area in accordance with the information communicated between the stations. The wall 16 defining the secured area prevents direct infrared communication between stations 12 and 14.

In accordance with the invention, an infrared data repeater 22 is employed to provide a communication path between station 12 and the repeater and between the repeater and station 14. Infrared repeater 22 is preferably mounted in a bore 24 formed in a top portion of wall 16. The bore is preferably dimensioned to be approximately one (1") inch in diameter and may be formed by conventional means. The bore extends from the exterior side 18 to the interior side 20 of the secured area. An elongated cylindrical housing 26 is closely received in bore 24 and extends outwardly through sides 18 and 20. A collar 28 interiorly receives the end of housing 26 in a close interfitting relationship which secures the collar to the housing. The collar has a circumferentially extending flange 30 disposed transversely to the housing to seal against wall 16. A semi-flexible tube 32 projects through a central aperture of collar 28 away from side 18 for mounting an infrared transmission relay unit 34. A flange-like base 33 of tube 32 is interiorly retained by collar 28 for securely anchoring the tube 32 to the rigidly mounted housing 26.

Relay unit 34 is enclosed by a shell-like or hemispherical housing 38 which is rigidly connected to the extended end of the semi-flexible tube 32. A semi-spherically-shaped printed circuit board 40 is interiorly mounted in housing 38. Such a semi-spherically shaped circuit board may be formed by conformal circuit board fabrication technology. Alternative standard circuit board fabrication would ordinarily require longer leads for the components for insertion into connectors on small flat circuit boards or ribbon cables. A plurality of photoemitters 42 and photodetectors 44 are mounted to circuit board 40 and positioned thereon to form an array of elements which are positioned at the exterior spherical surface of housing 38.

Photoemitter 42 may be of the type marketed by Stanley Electric Co., Ltd. and described in Stanley data sheets E101, E102 and E104. The intensity of such photoemitters has been increased by the work of Professor Junichi Nishizawa, head of the Electrical Communication Laboratory of Tohoku University. The work of Nishizawa has resulted in an increased brightness in the visible region from 160 mcd in 1979 to 500 mcd in 1982. An increase in intensity has been achieved in the infrared region since 1982. With the improvement in the photoemitters 42 as described above and other equivalent photoemitters, the efficiency of infrared emitters has been recently sufficiently improved so that the photoemitters may be pulsed by MOSFET drivers as described hereinafter. The foregoing described emitters can generate beams of 15 and 30 degree solid angles. It is only in the last few years that it has been possible to implement a transmission of 1.5 amps or more through such highly efficient photoemitters with a pulse duration of a few micro seconds and in some instances less than one micro second while generating an intense signal. Such intense infrared signals are of utmost importance in the transmission of signals through free space.

Circuit board 40 includes circuitry and mounts various components for forming an infrared receiver and an infrared transmitter as will be further described below. It should be appreciated that the array of infrared elements at the surface of the housing 38 essentially comprise a plurality of infrared photoemitter/photodetector pairs. Alternately, an array of photoemitter/photodetector pairs such as the H-500 LED and PD502 of Stanley Electric Co., Ltd. may be employed.

A collar 46 substantially identical to collar 28 interiorly receives the end of housing 26 projecting through interior side 18. Collar 46 is preferably threaded for interior receptive threading engagement with a complementary threaded surface formed at the peripheral end of housing 26 so that the infrared repeater may essentially be mounted in bore 24 by axially sliding the housing 26 from side 18 until the housing projects beyond side 20 and collar 28 engages side 18 and threading the collar on the end of the housing until collar 46 firmly engages side 20. Collar 46 also retains a semi-flexible tube 48 substantially identical to tube 32 for mounting a second infrared transmission relay unit 50.

Relay unit 50 is enclosed by a hemispherical housing 52 which is substantially identical to housing 38. Housing 52 exteriorly locates a second array of pairs of infrared light photoemitters 54 and photodetectors 56. In one form of the invention, the respective arrays of infrared photodetector elements are substantially identical for relay units 34 and 50. However, the invention is not limited to such a relationship. In one embodiment of the infrared repeater 22, relay unit 34 includes a single photodetector for receiving infrared signals, and relay unit 50 includes a single LED for transmitting infrared signals. In other embodiments one or both of the relay units may be limited to an array of only receiver or transmitter elements. A generally hemispherically configured circuit board mounts LEDs 54 and photodetectors 56. A second circuit board 60 is also mounted within housing 52.

An electrical cable 62 extends from circuit board 60 of relay unit 50 to circuit board 40 of relay unit 34 interiorly of the enclosure provided by housing 26 and the flexible tubes 32 and 48. Additional cable (not illustrated) may also connect circuit boards 40, 58 and/or 60 with other communication stations (not illustrated) by means of hard wired-type connections. Housing 26 also forms an axially extending receptacle for receiving an aligned pair of rechargeable batteries 64. In this regard, a spring 66 forces the batteries 64 into electrical contact for electrical engagement with the positive terminal 68. A photovoltaic sheet (not illustrated) electrically communicates with the batteries via lead 72 for recharging the batteries. A plug-in power module (not illustrated) may also be employed for supplying electrical power to the repeater 22. Because the illustrated infrared repeater is integrated into a building security system, it is imperative that means be provided so that the repeater is operative in the event of an electrical power failure in the building.

Figure 2:
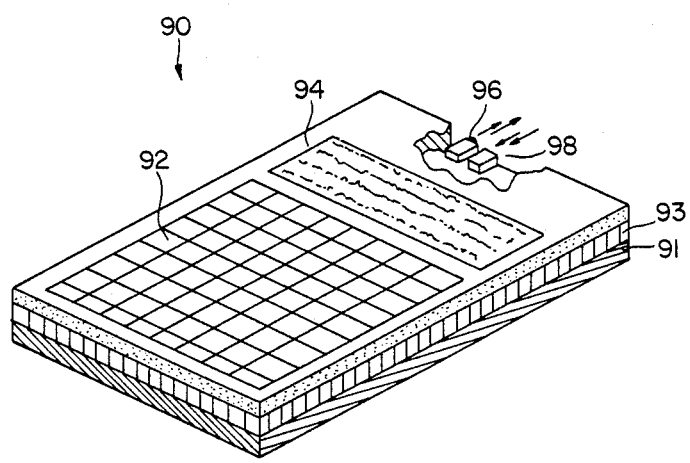
FIG. 2 is a perspective view, partly broken away and partly in schematic, illustrating a portable communication station which may be employed in accordance with the present invention.

In a preferred form of the communication system provided by the present invention, communication station 12 is a portable hand-held infrared transmitter and receiver which assumes the form of a remote card terminal 90 as illustrated in FIG. 2. Card terminal 90 is preferably dimensioned to measure approximately three (3") inches by five (5") inches by a half ($\frac{1}{2}$") inch. One side of the terminal is provided with a membrane keyboard 92 and a liquid crystal display (LCD) 94 such as the card terminal marketed by International Micro Industries of Cherry Hill, N.J. A middle layer 93 of card terminal 90 includes a CPU memory (not illustrated), an infrared LED 96 and an infrared photodetector 98. LED 96 and photodetector 98 are disposed close to the edge of the card terminal 90 in order to provide a relatively wide solid angle for infrared transmission and reception. Alternatively, the LED 96 and photodetector 98 may be positioned a distance from the edge of the terminal with a clear plastic material being interposed to embed the infrared elements and provide a transmission path to the edge of the card. A plastic filter or coating may be disposed in the foregoing transmission path to filter out electromagnetic waves in the visible and ultraviolet range to prevent interference with the infrared signals. A similar filter assembly may also be employed with the receiver and transmitter elements of relays 34 and 50. A third layer 91 of card terminal 90 includes a relatively flat configuration of batteries such as the "Polaroid" P-80 "POLAPULSE" battery or in the alternative, a layer of rechargeable button configured batteries.

Figure 4:
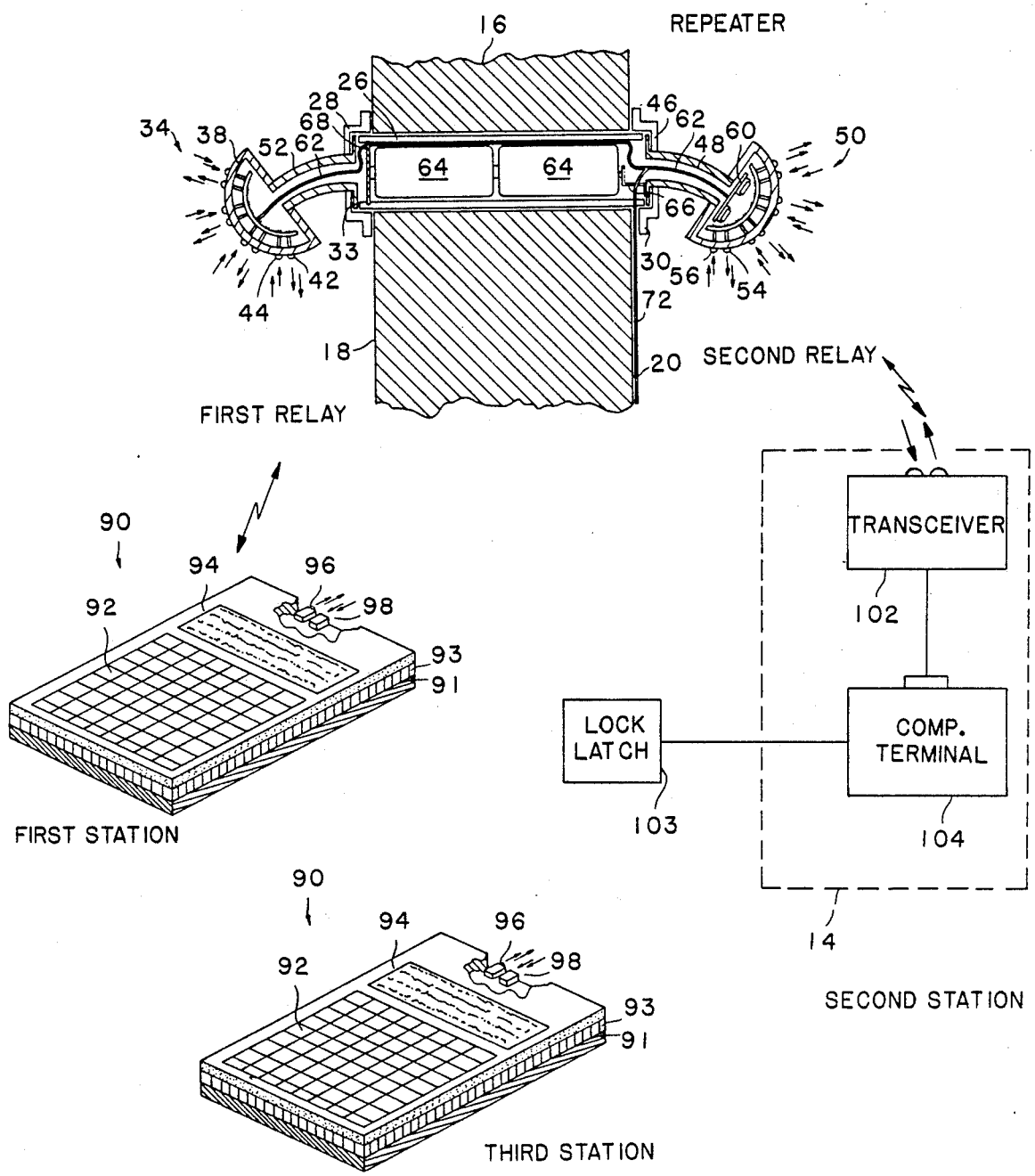
FIG. 4 is a schematic block diagram illustrating a communication system employing the infrared data repeater of FIG. 1 and the portable station of FIG. 2.

For the illustrated security system wherein communication station 14 is positioned within the secured area, a suitable form of station 14 is illustrated in FIG. 4 wherein an infrared transceiver 102 communicates with a computer terminal 104. In order to gain access to the secured area, an individual would employ a card terminal 90 and, by pushing appropriate keys of the membrane keyboard 92, would transmit infrared signals to the receiver elements of first relay unit 34 of repeater 10. The received signal would then be electrically communicated to the transmitter elements of second relay unit 50 for infrared transmission to station 14. Upon receipt of the signal at station 14, automatic means 103, an electrically operated lock for example, could be provided for allowing access to the controlled area if appropriate. If further information were required, communications could be conducted from station 14 to the receiver elements of relay unit 50 which electrically relay the signals to repeat the signals at the transmitter elements of relay unit 34 for infrared transmission to the same card terminal 90 which sent the original message or communication stations 12.

It should be appreciated that infrared data repeater 22 is configured to provide an efficient data communication means in instances where portable infrared transmitters and/or receivers are employed. The distribution of the infrared emitter receiver elements over an extended spherical surface results in a communication window encompassing a relatively large solid angle for receiving and widely dispersing infrared electromagnetic signals. Consequently, precise aiming or aligning of the infrared transmitter and/or receiver is not required. This latter feature may prove advantageous for security systems specifically designed for use by disabled or elderly individuals wherein conventional line of sight alignment of the receiver and transmitter elements may not be easily accomplished. The semiflexible neck structures allow the infrared transmitter and receiver elements to be orientated at a wide variety of selected directional orientations to afford a large degree of flexibility in the positioning of the infrared communication stations 12 and 14 relative to the repeater. This latter feature is significant in instances where either one or both of the communication stations is portable. Thus, the infrared repeater 22 may provide a pair of infrared communication regions which essentially encompasses the useable spaces of entire separated rooms.

Figure 3:
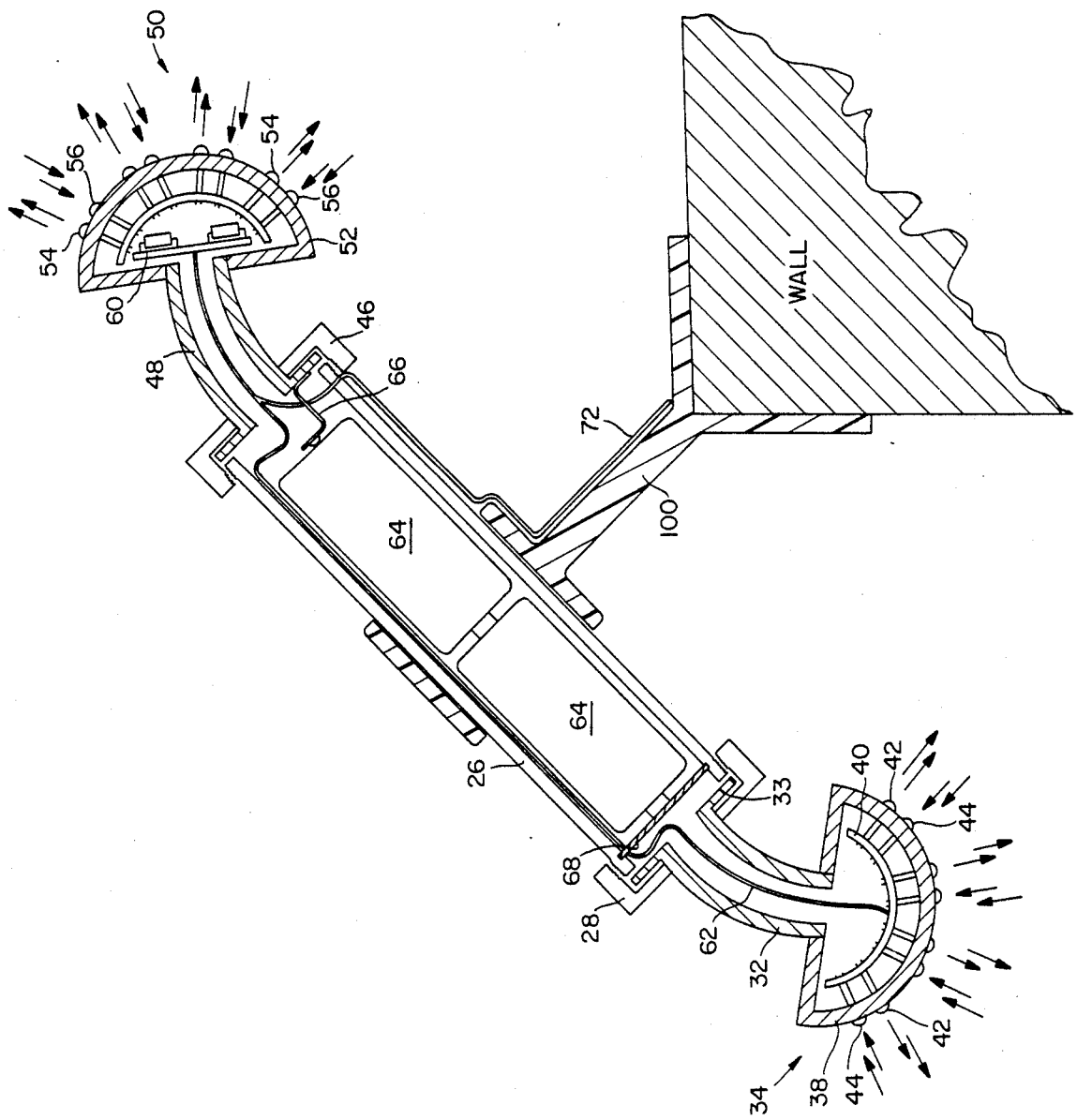
FIG. 3 is a top sectional view of a second embodiment of the infrared data repeater of FIG. 1.

With reference to FIG. 3, an alternative embodiment of the infrared data repeater functions to provide infrared communication around the corner of a wall or hallway. A corner bracket 100 for mounting the repeater interiorly receives housing 26 at an intermediate longitudinal position thereof. The bracket is preferably mounted near the top corner of the wall. The flexible tubes 32 and 48 provide means for selectively directionally orientating the relay units 34 and 50 to maximize the transmission capabilities of the repeater.

With additional reference to FIG. 1, housing 26 may be sectioned in telescoping fashion (shown by dashed lines) to provide a variable longitudinal dimension so that a single repeater 22 may suitably conform to a wide variety of wall thicknesses.

In accordance with the present invention, the infrared data repeater 22 may also employ means for communicating with a large number of additional stations. For example, in U.S. Pat. No. 3,618,021 an infrared communication system is disclosed wherein a number of subfunctions and classes of a major function are assigned different coding schemes for selectively transmitting communications to different stations. U.S. Pat. No. 3,618,021 is hereby incorporated by reference as though fully set forth herein. In accordance with the teaching of the latter patent, a given infrared generated message may include an addressing scheme for specifically transmitting selective portions of the message to a selected station. One or more of the stations could also be hard wired for receiving selective portions of the infrared generated data transmission. A repeater for the foregoing communication system may also employ one or more cleaved-coupled-cavity semiconductor lasers such as described in the November 1984 issue of Scientific American Magazine. The latter laser can be precisely tuned to provide two channels for data communications. It should be also be apparent to one skilled in the art that the infrared data repeater of the present invention may also include means for scrambling and/or unscrambling the information transmitted and/or received by the repeater.

Figure 6:
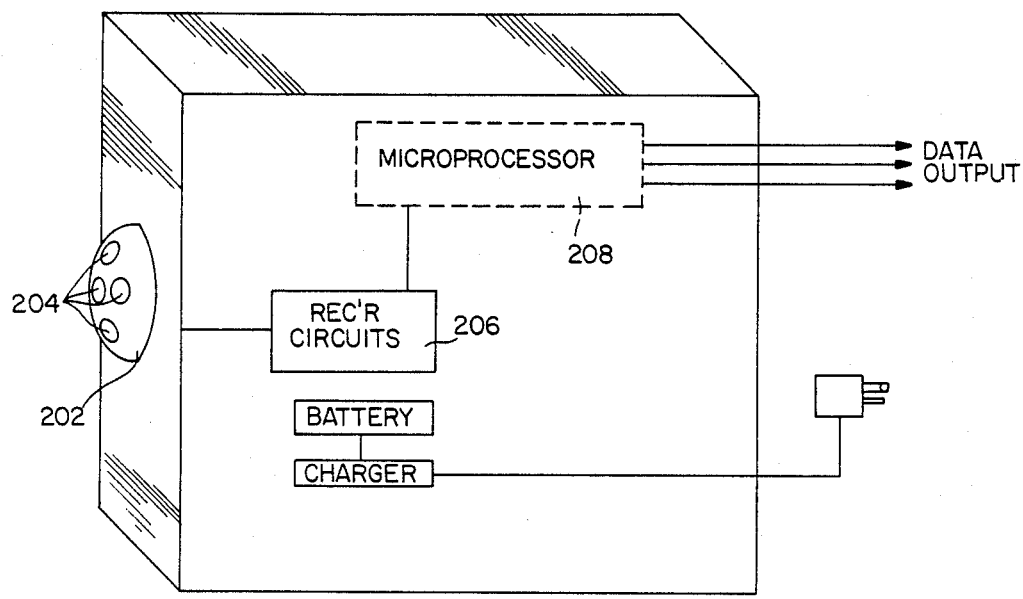
FIG. 6 is a schematic diagram of a receiver unit for the infrared data communication system of the present invention.
Figure 15A:
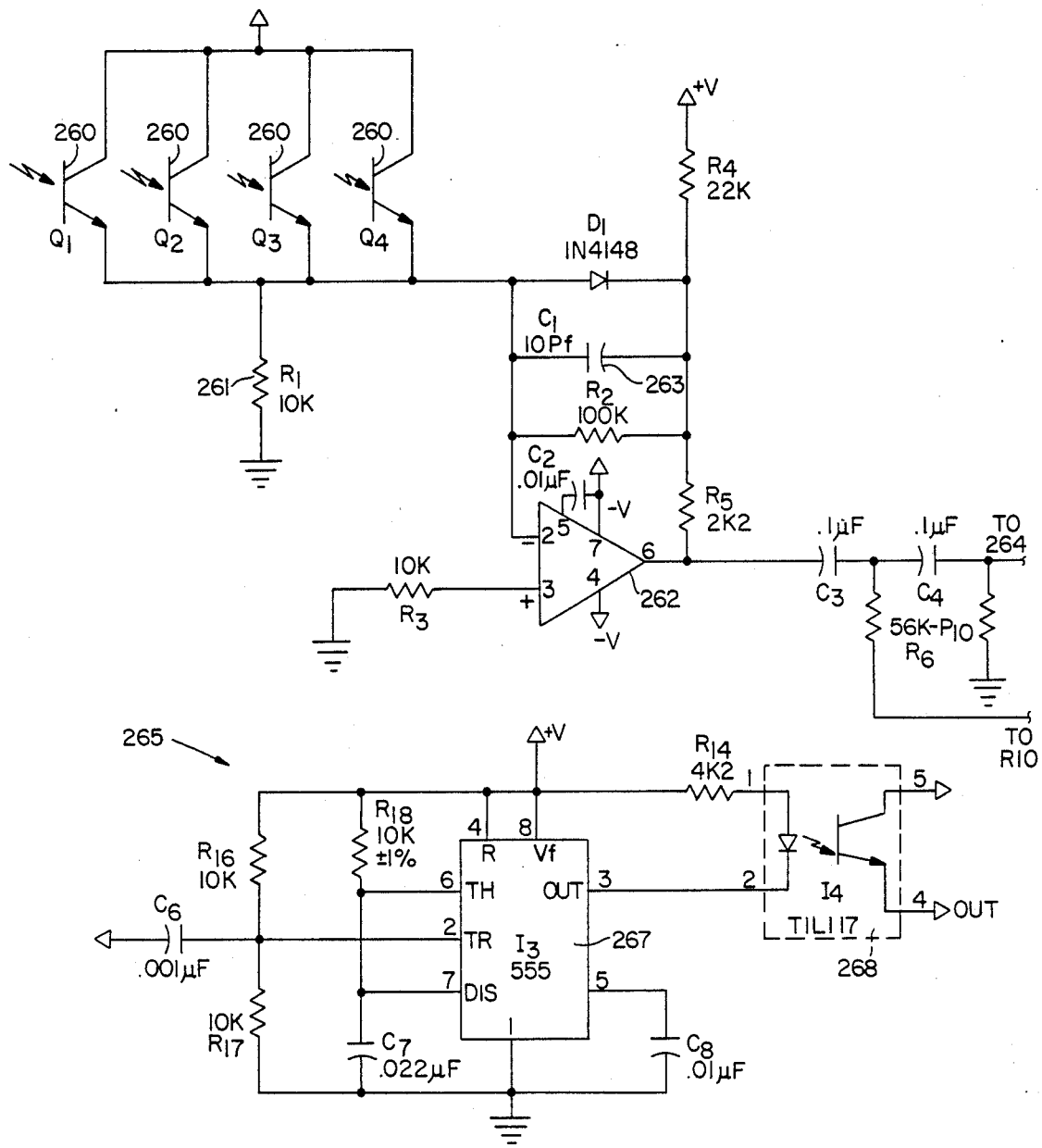

With reference to FIG. 6, an infrared data receiver unit is generally designated by the numeral 200. The unit has a receiver head 202 which mounts an array of photodetectors 204. The photodetectors 204 are angularly oriented to provide a sensing window which substantially extends over a wide solid angle to provide communication throughout a substantial region or enclosed space remote from the receiver unit. The photodetectors 204 transmit an electrical signal to the receiver circuits 206. An exemplary receiver circuit 206 is illustrated in FIGS. 15a and 15b. The receiver circuit communicates with a micro-processor 208 which controls the data output from the receiver unit.

Figure 5:
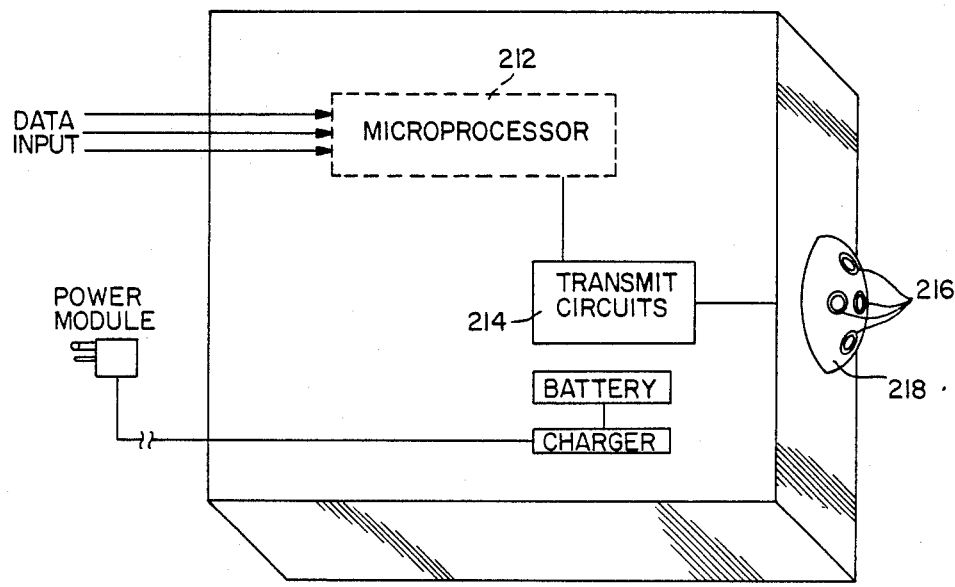
FIG. 5 is a schematic diagram of an infrared transmitter unit for the infrared data communication system of the present invention.
Figure 14A:
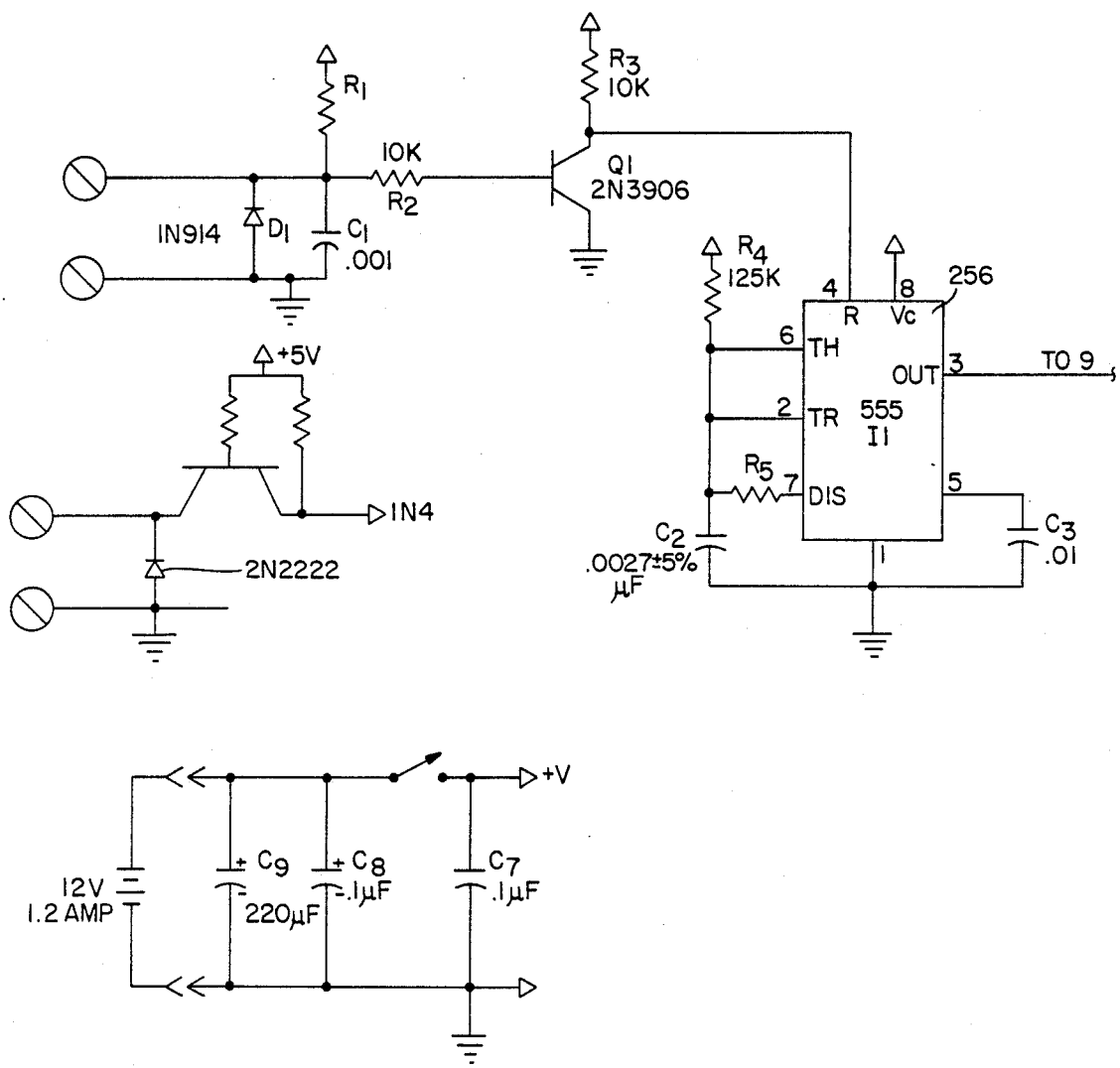
FIGS. 14a and 14b are schematic circuit diagrams for the infrared data transmitter of FIG. 5.
Figure 14B:
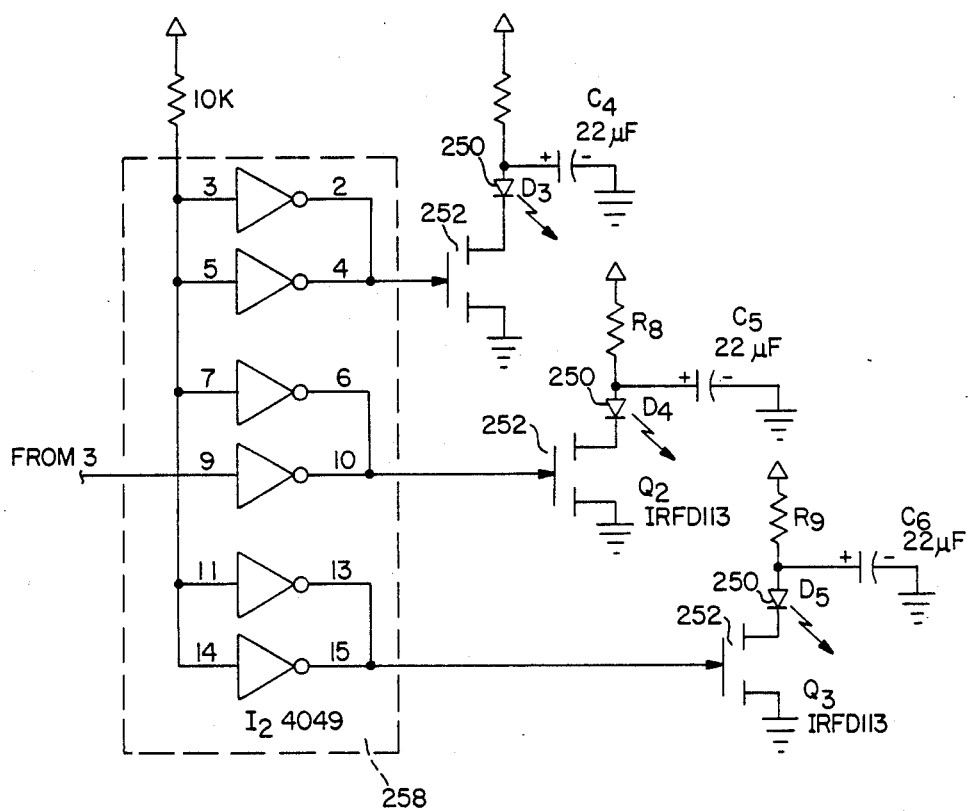

A transmitter unit designated generally by the numeral 210 is illustrated in FIG. 5. Transmitter unit 210 is compatible with the infrared receiver unit 200. Data input to the infrared transmitter unit communicates with a micro-processor 212 which transmits appropriate commands for controlling the data transmission. The input data communicates with transmitter circuits 214 which in turn drive an array of light emitting diodes 216. The diodes 216 are mounted on a transmitter head 218. The diodes are suitably angularly oriented so that the array generates a composite infrared transmission beam which covers a wide solid angle originating at the transmitter head. An exemplary transmitter circuit 214 is illustrated in FIGS. 14a and 14b.

The receiver unit 200 and the transmitter unit 210 may be mounted on opposite sides of a wall or barrier and electrically connected by means of an extremely thin flexible cable (not illustrated). The cable can thus extend between a door and frame and preferably has an adhesive backing for securing the cable position.

A bi-directional infrared repeater unit is designated generally by the numeral 220 in FIG. 7. Repeater unit 220 integrates a pair of receiving units and a pair of transmitting units to form a single infrared repeater station. A housing 222 (only schematically illustrated) is adapted for mounting at the ceiling or at the top of a room or enclosure. Four turrets 224 project obliquely from the underside of the housing. The turrets 224 universally mount spherical or quasi-spherical communication heads 226. Arrays of photodetectors 228 are mounted to two of the communication heads and are angularly oriented to provide a wide viewing window which substantially encompasses the effective work space of the enclosure. Likewise, arrays of photoemitters 230 are mounted to the other pair of communication heads and angularly oriented to provide a wide transmission angle which substantially encompasses the effective work space of the enclosure. It will be appreciated that the turret/universal head arrangement is essentially a ball and socket configuration for maximizing the coverage and the efficiency of the repeater unit in relation to the specific structural characteristics of a given room or enclosure. During installation, the universal heads are angularly rotated to the proper angular orientation. Each of the sockets has a set screw (not illustrated) which is tightened to secure the head in the proper selected angular orientation. The exchange of data between the transmitter circuits 232 and the receiver circuits 234 is controlled by a micro-processor 236. The transmitter circuits 232, receiver circuits 234 and micro-processor may be similar in form and function to the previously described circuits and microprocessors for receiver unit 200 and transmitter unit 210.

Figure 10:
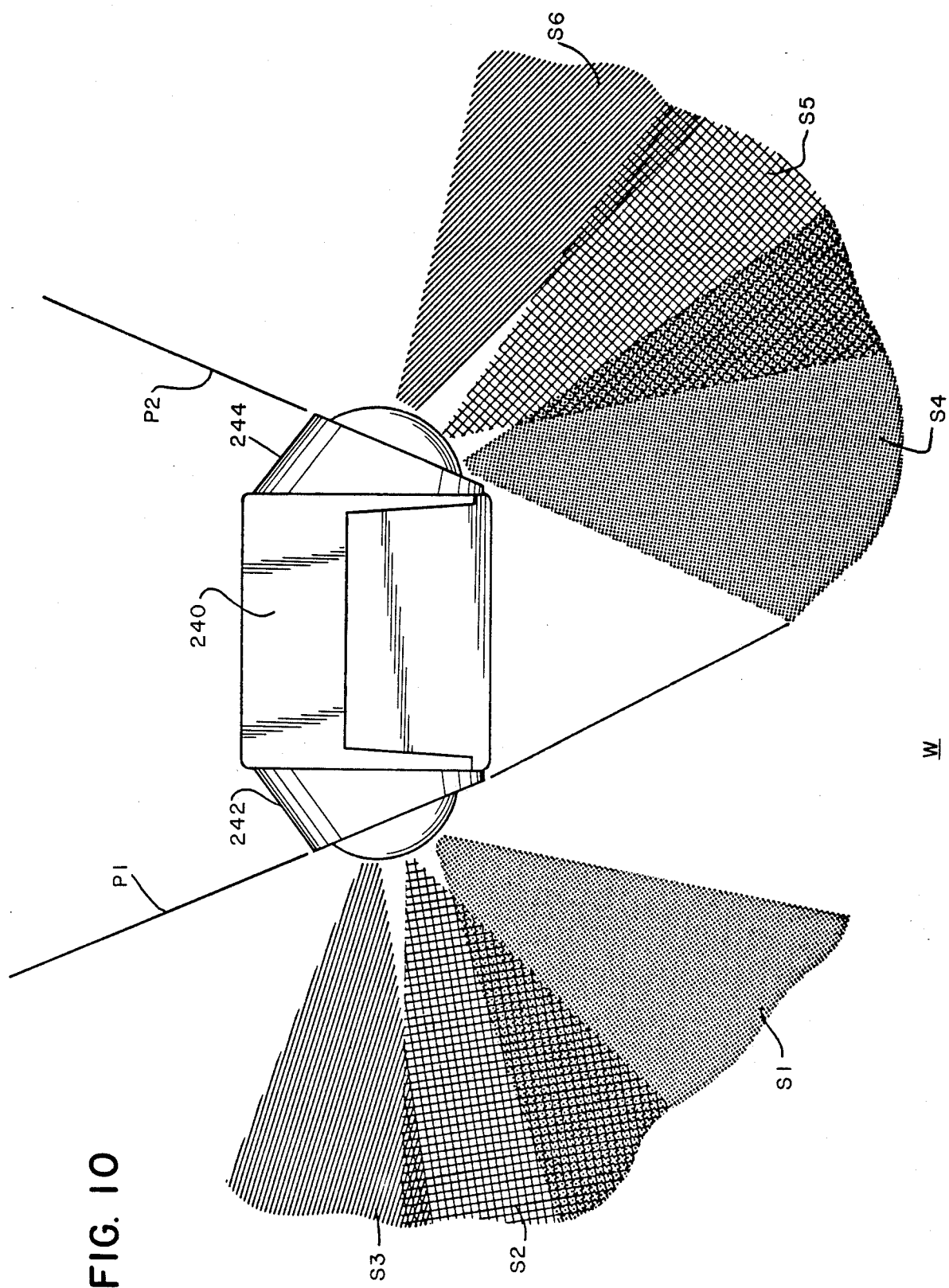
FIG. 10 is a diagramatic illustration illustrating various angle relationships for an infrared transmitter and receiver in accordance with the present invention.

With reference to FIG. 10, an infrared repeater 240 illustrates how various geometric and power considerations are implemented so that the infrared data repeater communicates throughout the effective work space W of the enclosure. The repeater is mounted above the work space W. Infrared sensors (not illustrated) which are angularly oriented for receiving data transmitted from relatively close (in relation to repeater 240) locations within the work space W may have a relatively large solid angle viewing window as exemplified by the solid angle S1 in FIG. 10. Sensors which are oriented to receive infrared data communications transmitted from an intermediate location within work space W have smaller solid angle viewing windows as illustrated by S2 in FIG. 10. Sensors which are oriented to receive infrared data communications which are transmitted from relatively remote locations of the work space W have correspondingly smaller solid angle viewing windows as illustrated by solid angle S3 in FIG. 10. The viewing windows overlap to encompass substantially the entire effective work space W.

Likewise, similar considerations would govern the solid angles of the composite infrared beam transmission for the infrared transmitters (not illustrated in FIG. 10). For transmitting infrared data to relatively close locations, a large transmitter beam width solid angle designated as S4 is employed; for intermediate ranges, an intermediate transmitter beam width solid angle designated as S5 is employed; and for transmitting infrared data to locations relatively remote from the repeater unit, a smaller transmitter beam width solid angle designated as S6 is employed. The transmission beams overlap to encompass substantially the entire work space W. It should be appreciated that a second pair of transmitter and receiver units are employed as described for repeater 220 to provide bi-directional infrared communication throughout the work space W. There is also an inverse power relationship between the radiated power distribution for the element and the associated solid angle. For example, the power density within transmission angle S4 is less than the power density within transmission angle S6 if the power characteristics of the corresponding transmitter elements is otherwise equal.

In accordance with the above considerations, one embodiment of the invention employs arrays of photoemitters and photodetectors wherein the photo elements with the larger associated solid angles are located at the vertically higher locations of the mounting head of the repeater and the photo elements with the smaller associated solid angles are location at the vertically lower locations of the mounting head. The higher elements are aimed for communication with more remote locations and the lower elements are aimed for communication with closer locations within the adjacent work space or enclosure. The latter described embodiment will exhibit a higher power density for the photoemitters and photodetectors which are directed for communication with remote locations as compared to the photoemitters and photodetectors which are directed for communication with locations which are relatively close to the repeater. However, a larger solid angle can be effectively served by the lower power density for the photoemitters and photodetectors which are directed for communication with locations generally directly below the repeater.

The ball/socket type configuration provided by turrets 242 and 244 also provide a means for selectively universally orienting the arrays of receiver and transmitter elements to accommodate a wide spectrum of work space configurations. Planes P1 and P2 in FIG. 10 define the extreme boundaries of the receiver windows and transmission beams, respectively, for the given turret mounting structure.

With reference to FIGS. 14a and 14b, a transmitting circuit for a transmitter unit or an infrared repeater unit is illustrated. Three infrared light emitting diodes 250 are pulsed for very short pulses on the order 6 to 8 micro-seconds with as high as 1.5 ampere currents passing through the diodes. MOSFET drivers 252 deliver the high current to the diodes for the short time durations. Each of the drivers 252 has a corresponding resistance/capacitance RC network for maximizing the intensity of the received light and for setting the correct duration rise time and fall time of the emitted pulse by optimally regulating the RC networks for the pulse frequency and duration. The voltage drop across the MOSFET drivers 252 regulates the diode current, thereby maximizing the efficiency of the driver circuit. The driver circuit also employs a 555 type timer 256 and a 4049 type integrated circuit 258.

A receiver circuit for a receiver unit for an infrared repeater unit is illustrated in FIGS. 15a and 15b. The circuit employs four infrared photodetectors 260 as a current source. The time constant of the photodetectors 260 is a function of the component capacitance and load resistance. The current output of the photodetectors 260 is applied to a virtual ground of an operational amplifier 262. The operational amplifier is operated in a transimpedence mode. A 10,000 ohm resistor 261 is interposed in series with each of the photodetectors 260 and leads to ground so that when the impedance of the photodetector is very high when no or very small amounts of infrared radiation impinge on the photodetectors 260, the photodetectors function as if they were applied through the operational amplifier 262.

A two stage filtering circuit is employed for filtering noise to thereby achieve noise insensitivity. A 10 pf capacitor 263 shunts the high frequencies generated by the received pulse which may be on the order of 6 to 8 micro-seconds. The operational amplifier 262 functions as a low pass filter. A one-half TL 062 type operational amplifier 264 functions as a high pass filter which results in a band pass filter which is tuned not only to the duty cycle (which is 300 Hz in the illustrated schematic), but can also be tuned to rates as high as approximately 1200 to 2400 Hz. The network above the operational amplifier 262 prevents the phototransistors and the operational amplifier from being saturated by a short pulse which would prevent detection of such a pulse. In addition, the network allows for relatively short rise times. A third operational amplifier 266 is a comparator which reduces noise by allowing an output only in the event that the amplifier is driven to a slightly negative state when a proper pulse has been received. A timing circuit 265 employs a 555 type timer 267 for generating a 300 Hz signal. An optoisolator 268 which may be a Texas Instrument TIL117 optoisolator is also incorporated into the timing circuit.

Figure 13:
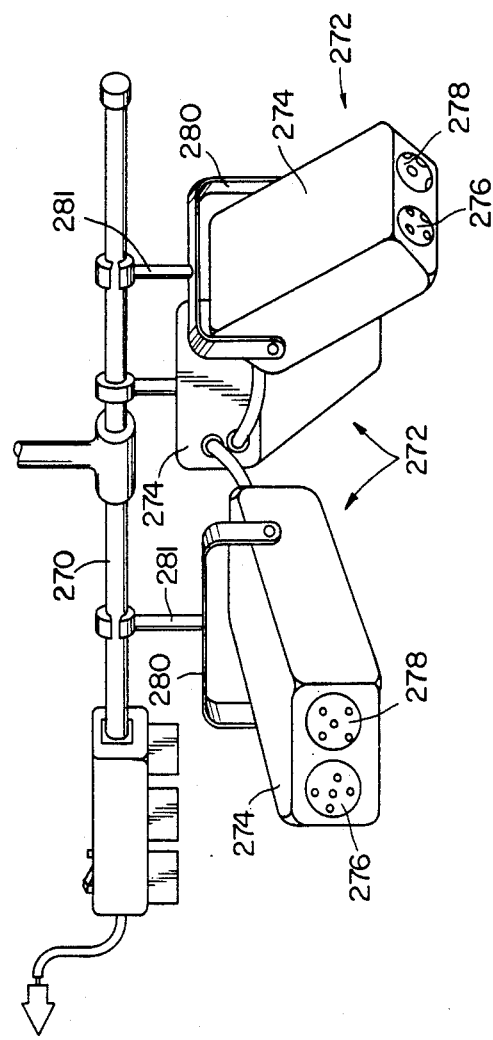
FIG. 13 is a perspective view of an infrared data repeater cluster in accordance with the present invention.

With reference to FIG. 13, a suspension beam 270 may be suspended from a ceiling or structure which is disposed above the work space. The suspension beam 270 functions as a support for mounting various infrared repeater units 272. The repeater units have a rectangular housing 274. A transmitter head 276 and a receiver head 278 are disposed at one end of the housing. A U-shaped bracket 280 is pivotally mounted at opposing sides of the housing. A connecting bar 281 upwardly extends between the bracket 282 and the suspension beam. The bar 281 mounts a yoke which engages the suspension beam for sliding positioning along the suspension beam. The suspension beam also functions as a conduit to supply electrical power to each of the repeater units 272. A multi-outlet power strip 282 connects at one end of the suspension beam. It should be appreciated that the repeater units may be angularly oriented and longitudinally positioned along the beam so that direct line of sight communication is provided with a substantial portion of the enclosure or space within which the cluster of repeater units is mounted.

Figure 11:
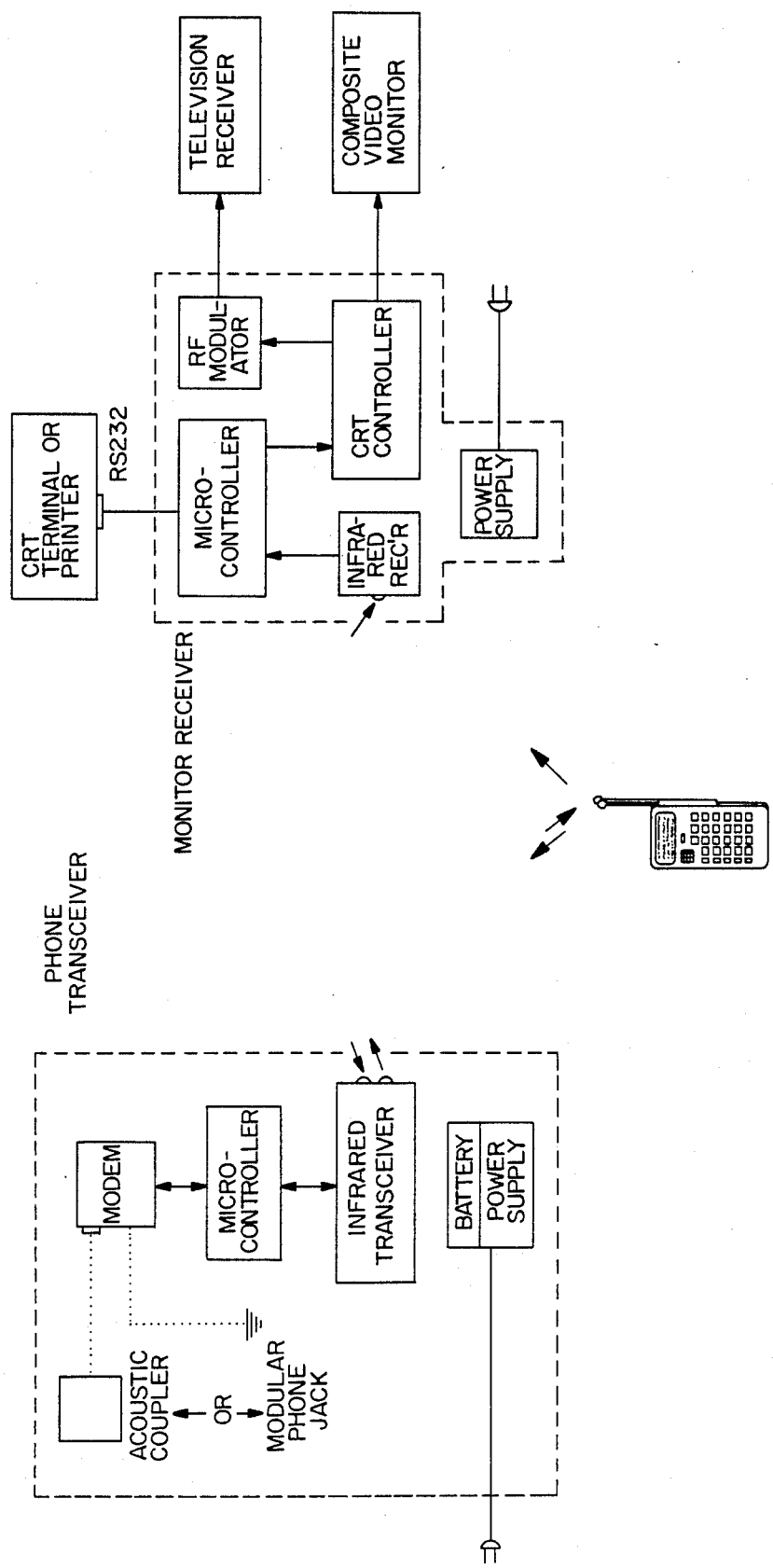
FIG. 11 is a block diagram of an infrared data communication system in accordance with the present invention.
Figure 12:
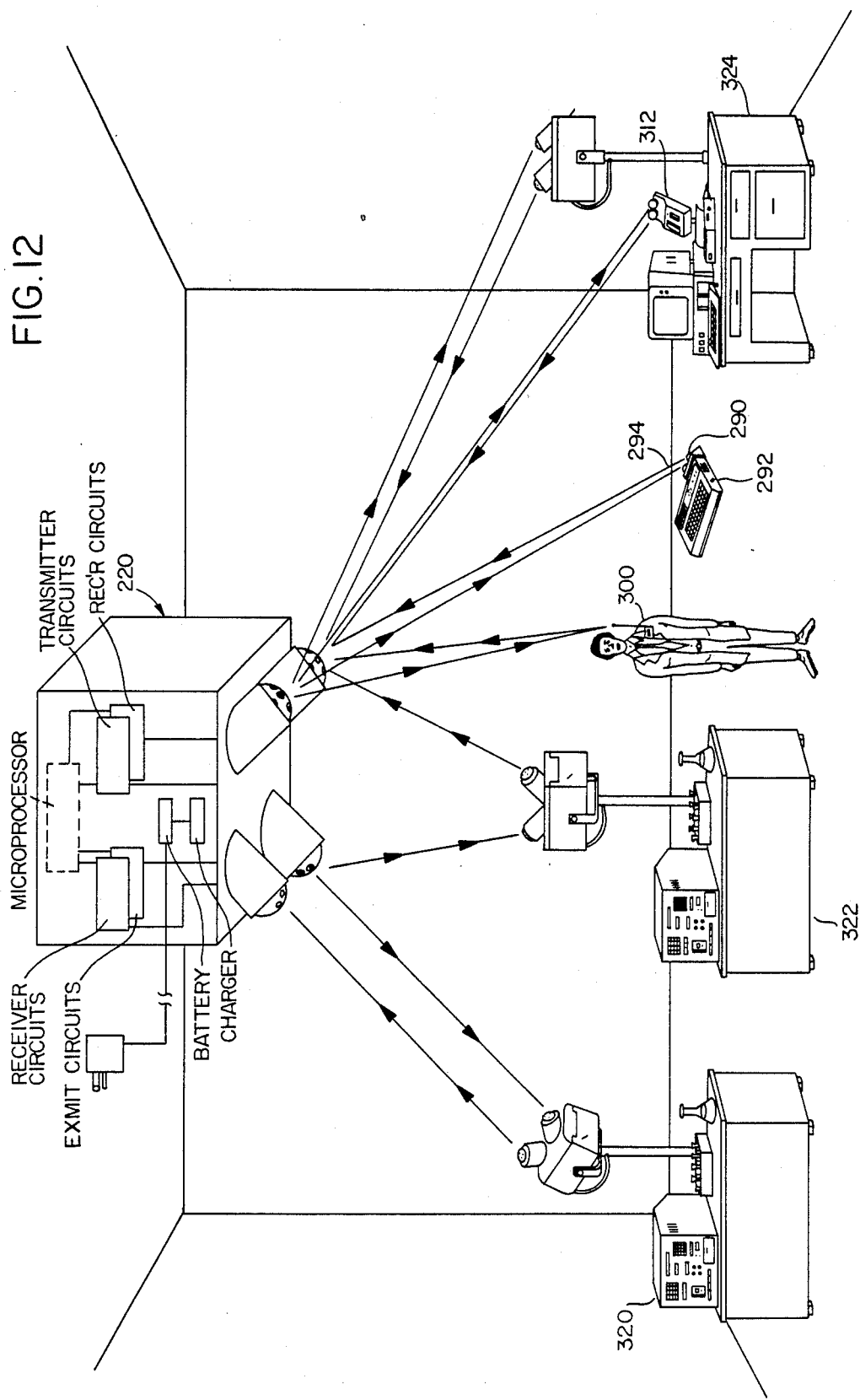
FIG. 12 is a schematic diagram illustrating an infrared data communication system adapted for use in a laboratory.

Integrated infrared data communication systems in accordance with the present invention are illustrated in FIGS. 11 and 12. In FIG. 12, a data communication system for a laboratory instrumentation system employs an infrared repeater unit such as repeater 220 for bi-directional data communication between the various instrumentation, communication and processing stations. The repeater 220 is preferably suspended from the ceiling of the lab enclosure. The repeater 220 functions to poll each of the various stations and gather data from each of the stations for retransmittal to an infrared receiver 290. The receiver 290 is connected to a computer 292 for processing and storage of the data. It should be appreciated that the system functions in a bi-directional mode so that the computer is capable of retransmitting commands or any other information through infrared transmitter 294 via repeater 220 to anyone of the stations. The micro-processor 236 in the repeater unit controls the general operation of the communication system and the various directional logic and communication traffic for the system.

Figure 9:
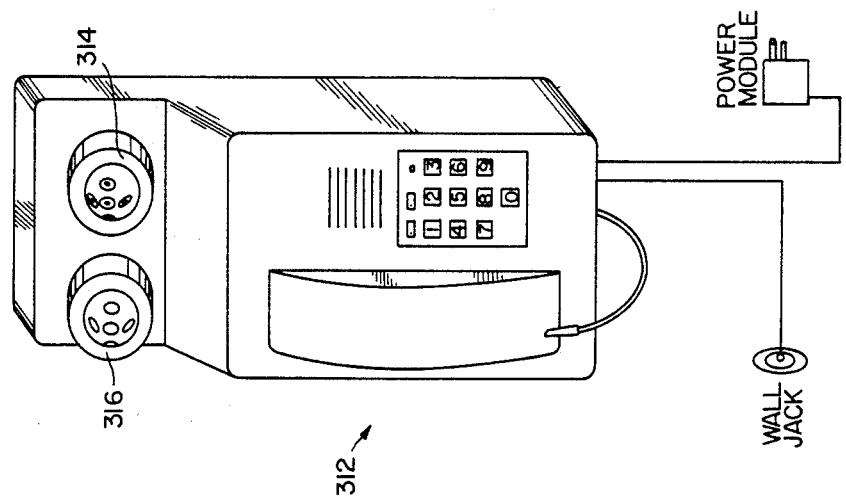
FIG. 9 is a front prospective view of a phone transceiver pad and a phone employed in the infrared data communication system of the present invention.
Figure 8:
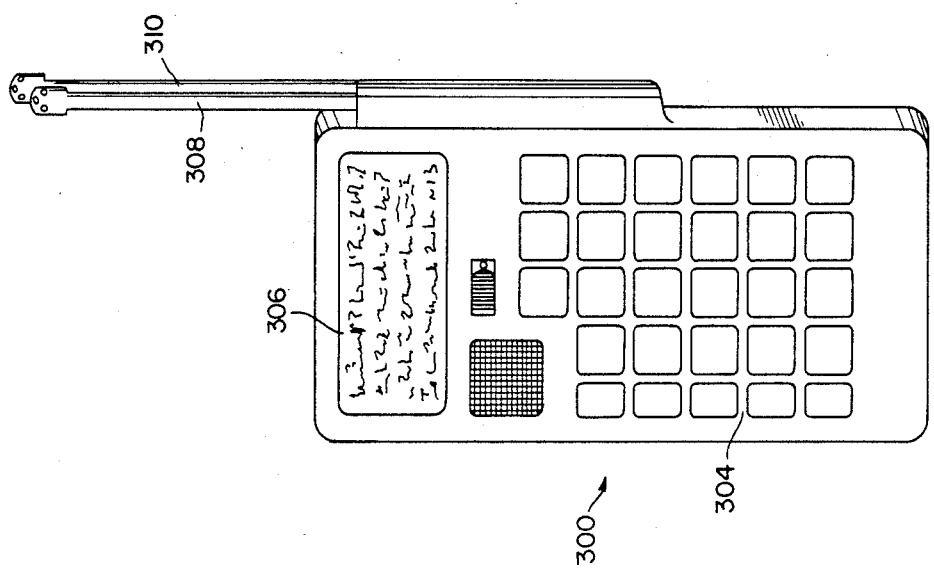
FIG. 8 is a front prospective view of a vest pocket local infrared network terminal employed in the infrared data communication system of the present invention.

The illustrated system of FIG. 12, which is intended to be suggestive of numerous additional embodiments and applications, shows seven receiving and transmitting stations within the laboratory. One of the stations is in the form of a portable computer 298 having an infrared receiving end transmitting unit. A second station is in the form of a vest pocket card terminal 300 best illustrated in FIG. 8, card terminal 300 has a keyboard 304, a visual display 306, an infrared transmitter 308 and an infrared receiver 310. A third station is in the form of a phone transceiver 312. Phone transceiver 312 is best illustrated in FIG. 9 and includes an infrared emitter turret 314 and an infrared receiver turret 316. Two other stations 320 and 322 have receiving and transmitting units attached for data communication with various instrumentation. Another station 324 has a computer instrumentation system with an infrared receiving and transmitting station. Each of the fixed receiving and transmitting stations are preferably positioned so that there is a clear line of sight between the overhead repeater 320 and the receiving and transmitting stations for facilitating the infrared data communication.

While a preferred embodiment of the foregoing invention has been shown and described, various modifications, and substitutes may be made thereto without departing from the spirit and scope of the present invention. Accordingly, it is to be understood that the present invention has been described by way of illustration and no limitation.

What is claimed is:

1. A communication system for transmitting and receiving electromagnetic signals in the infrared frequency range across a communication barrier to the passage of infrared energy comprising:

first station means functionally disposed on one side of the communication barrier to transmit and receive electromagnetic signals in the infrared range;

second station means functionally disposed on another side of said communication barrier to transmit and receive electromagnetic signals in the infrared range;

third station means functionally disposed on the said one side of the communication barrier to transmit and receive electromagnetic signals in the infrared range;

repeater means disposed relative to said barrier to transmit and receive infrared electromagnetic signals form and to said first, second and third station means, said repeater means comprising:

first relay means positioned on the one side of said barrier to transmit and receive infrared elecrromagnetic signals to and from said first and third station means, the distance between said first station means and said first relay means being greater than the distance between said third station means and said first relay means;

second relay means positioned on the other side of said barrier to transmit and receive electromagnetic signals to and from said second station means;

electrical means to provide electrical communication between said first and second relay means; and said first relay means comprising a plurality of receiver elements and a plurality of irradiator elements configured in an array for receiving and transmitting infrared electromagnetic signals over a substantial solid angle, a first and a second of said receiver elements having receiving windows encompassing unequal solid angles with the receiver element sensitivity per unit of solid angle of said windows being inversely related to the size of the solid angle, said first station means being functionally located within the lesser receiver element solid angle and said third station menas being functionally located within the greater receiver element solid angle, and a first and a second of said irradiatior elements having emitting beams encompassing unequal solid angles with the emitting power density of said beams being inversely related to the size of the beam solid angles, said first station means being functionally located within the lesser irradiator element solid angle and the third station means being functionally located within the greater irradiator element solid angle.

2. The communication system of claim 1 wherein the array defines a surface which is substantially a section of a sphere.

3. The communication system of claim 1 wherein at least one receiver element of one relay means is in electrical communication with at least one irradiator element of the other relay means so that an infrared electromagnetic signal transmitted from one station is received at one relay means and repeated at the other relay means for re-transmission to another station.

4. The communication system of claim 1 wherein each said relay means comprises a plurality of receiver elements and a plurality of irradiator elements configured in an array substantially defining a section of a sphere and further comprising a shell-like housing generally enclosing said relay means and generally conforming to the shape of said array.

5. The communication system of claim 4 further comprising an elongated tubular housing enclosing said electrical means, said shell-like housings connecting at opposite ends of said tubular housing.

6. The communication system of claim 5 wherein said tubular housing is sectioned in telescoping fashion to form a housing having a variable longitudinal dimension.

7. The communication system of claim 5 wherein each end of said tubular housing connects with a flexible neck means connecting a said shell-like housing to selectively directionally orientate the array of receiver and irradiator elements.

8. The communication system of claim 1 wherein said repeater means further comprises:
circuit means to selectively receive infrared electromagnetic signals of a given signal wave length from one of said station means;
memory means to store said selectively received signals; and
repeater means to transmit said selectively received signals to a said relay for transmission to the other of said station means.

9. The communication system of claim 7 wherein the communication barrier is a wall and said tubular housing is positioned in the wall with said shell-like housings being disposed at opposite sides of said wall.

10. The communication system of claim 1 wherein one of said station means comprises a self-contained hand-held device comprising circuitry including a light emitting diode and a photosensor and having a keyboard for activating the light emitting diode and a display means activatable in response to energy impinging on the photosensor.

11. An infrared data repeater comprising:
infrared receiver means to receive infrared electromagnetic signals, said receiver means comprising a plurality of photodetector elements each having a receiving window encompassing a pre-established solid angle with at least two of said solid angles being unequal and the sensitivity per unit solid angle of said photodetector elements being inversely related to the size of the respective window solid angles, said plurality of receiving elements being arranged so that said windows overlap and combine to encompass a substantial solid angle;
infrared transmitter means to transmit infrared electromagnetic signals, said transmitter means comprising a plurality of photoemitter elements each generating an emitting beam encompassing a pre-eestablished solid angle with at least two of said beam solid angles being unequal and the emitter power density of said photoemitter elements being inversely related to the size of the respective beam solid angles, said plurality of emitter elements being arranged so that said beam angles overlap and combine to encompass a substantial solid angle;
electrical circuit means connecting said infrared receiver and transmitter means so that infrared electromagnetic signals received by said receiver means are electrically communicated for re-transmission by said transmitter means; and
housing means to at least partially enclose said electrically circuit means and to mount said infrared receiver and transmitter means in spaced relationship.

12. The infrared data repeater of claim 11 further comprising directional means to selectively directionally orientate at least one of said infrared receiver and transmitter means relative to said housing means.

13. The infrared data repeater of claim 11 wherein said housing means comprises an elongated tubular member.

14. The infrared data repeater of claim 11 wherein said receiver means and said transmitter means each comprises a head having a generally spherical section shaped mounting means for mounting said elements and a turret for receiving said head with said head being angularly positionable relative to said turret.

15. The infrared data repeater of claim 11 wherein said infrared transmitter means comprises circuitry including a plurality of light emitting diodes, said diodes being configured in an array so as to provide re-transmission of infrared signals throughout a region defining a substantial solid angle.

16. The infrared data repeater of claim 11 wherein said infrared receiver means comprises circuitry including a plurality of phototransistors configured in an array for receiving infrared signals from a region defining a substantial solid angle.

17. The infrared data repeater of claim 11 wherein said photodetector elements are arranged in vertically spaced relationship with the relative sizes of the corresponding receiving window solid angles being inversely related to the relative vertical height of the respective photodetector elements.

18. The infrared data repeater of claim 11 wherein said photoemitter elements are arranged in vertically spaced relationship with the relative sizes of the corresponding beam solid angles being inversely related to the relative vertical height of the respective photoemitter elements.

19. The infrared data repeater of claim 11 wherein said receiver means and said transmitter means each comprise a head having the general shape of a spherical section for mounting said elements.

20. An infrared data repeater comprising:
receiver means for receiving infrared frequency electromagnetic signals, said receiver means comprising a plurality of photodetector elements each having a receiving window encompassing a pre-established solid angle with at least two of said solid angles being unequal, said plurality of photodetector elements being arranged so that said windows overlap and combine to encompass a substantial solid angle;
transmitter means for generating and emitting infrared frequency electromagnetic signals, said transmitter means comprising a plurality of photoemitter elements each generating an emitting beam encompassing a pre-established solid angle with at least two of said beam solid angles being unequal, said plurality of emitter elements being arranged so that said beam angles overlap and combine to encompass a substantial solid angle;

means electrically coupling said infrared receiver and transmitter means so that data modulated on infrared signals received by said receiver means is electrically communicated to said transmitter means for re-transmission; and housing means at least partially enclosing said coupling means for mounting said infrared receiver and transmitter means in spaced relationship, said receiver means and said transmitter means each comprising a head having a generally spherical section shaped mounting means for mounting said elements and a turret for receiving said head with said head being angularly positionable relative to said turret.

* * * * *